United States Patent [19]

Iyengar

[11] 4,253,863

[45] Mar. 3, 1981

[54] APPARATUS FOR MASS PRODUCING FIBER OPTIC PREFORMS AND OPTIC FIBERS

[75] Inventor: Rama Iyengar, Roanoke, Va.

[73] Assignee: International Telephone and Telegraph Corporation, New York, N.Y.

[21] Appl. No.: 804,207

[22] Filed: Jun. 7, 1977

[51] Int. Cl.³ .............................................. C03B 37/00
[52] U.S. Cl. ....................................... 65/181; 65/355; 65/DIG. 4; 65/3 A
[58] Field of Search .................. 65/DIG. 7, 374 R, 24, 65/26, 121, 32, DIG. 4, 11 R, 12, 157, 3 A, 181, 355, 3; 13/6; 156/613; 118/724, 725

[56] References Cited

U.S. PATENT DOCUMENTS

| | | | |
|---|---|---|---|
| 1,628,417 | 5/1927 | Miller | 65/23 X |
| 2,908,738 | 10/1959 | Rough | 13/6 X |
| 3,025,146 | 3/1962 | Runyan | 65/26 X |
| 3,198,615 | 8/1965 | Stalego | 65/12 X |
| 3,230,291 | 1/1966 | Walz | 13/6 |
| 3,330,251 | 7/1967 | Gutsche | 118/725 |
| 3,459,504 | 8/1969 | Bracken et al. | 156/613 X |
| 3,536,522 | 10/1970 | Cecil et al. | 156/613 |
| 3,676,093 | 7/1972 | Schrewelius | 65/12 X |
| 3,725,023 | 4/1973 | Parris | 65/32 X |
| 3,806,570 | 4/1974 | Flamenbaum et al. | 264/332 X |
| 3,823,995 | 7/1974 | Carpenter | 65/121 X |
| 3,899,557 | 8/1975 | Dietze | 264/81 |
| 3,933,453 | 1/1976 | Burke et al. | 65/DIG. 7 |
| 3,957,474 | 5/1976 | Kobayashi et al. | 65/DIG. 7 |
| 4,090,055 | 5/1978 | King | 65/DIG. 7 |

Primary Examiner—William F. Smith
Attorney, Agent, or Firm—John T. O'Halloran; Peter C. Van Der Sluys

[57] ABSTRACT

A large plurality of fiber optic preforms are manufactured by chemically vapor depositing the fiber optic glass constituents on the exterior surface of electrically heatable mandrels. A corresponding plurality of mandrels are located relative to a common source of materials for chemical vapor deposition thereon. A substantial savings in materials cost, manufacturing time and greater uniformity between the individual preforms is thereby accomplished.

10 Claims, 6 Drawing Figures

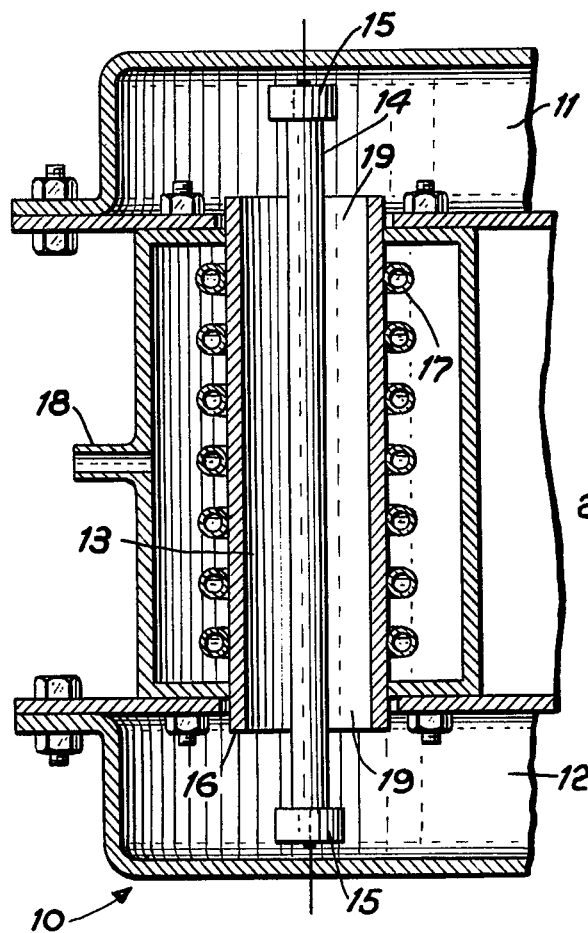
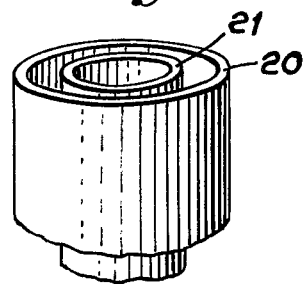
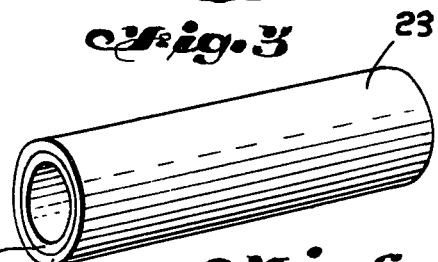
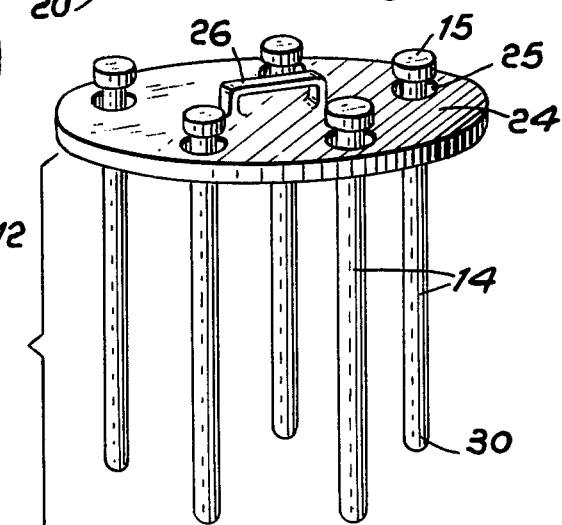
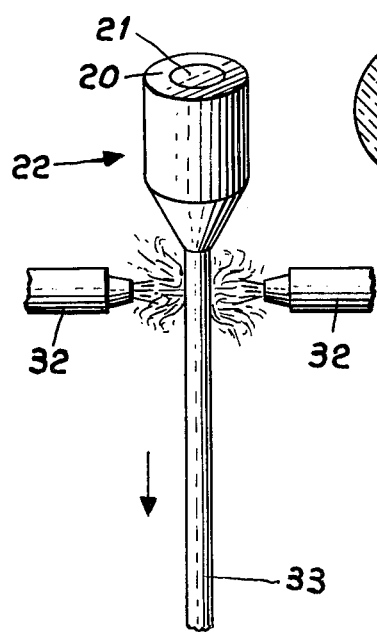
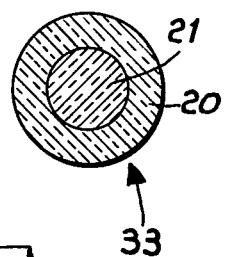
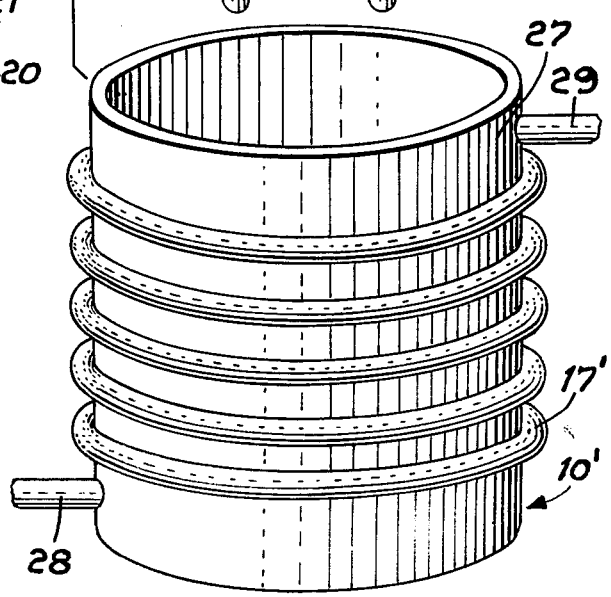

APPARATUS FOR MASS PRODUCING FIBER OPTIC PREFORMS AND OPTIC FIBERS

BACKGROUND OF THE INVENTION

Several methods have been proposed for providing optical fiber glass materials on the inner surface of disposable cylindrical mandrels. One such method is that described within copending application Ser. No. 804,208, filed June 7, 1977, in which the glass constituents are chemical vapor deposited on the interior surface of a carbon mandrel and the carbon mandrel is later removed by combustion.

Another method for depositing glass constituents on a disposable mandrel is described within U.S. application Ser. No. 804,209 filed June 7, 1977. This application teaches a method of chemical vapor depositing glass constituents upon the interior surface of a split carbon mold. The mold is subsequently opened and the glass constituents are removed in tubular form for processing into a fiber optic preform.

The method of depositing glass constituent materials on the inner surface of carbon molds is not readily conducive to the mass production of fiber optic materials since some additional means of providing a travelling hot zone is usually required to insure that the glass forming constituents will deposit uniformly on the interior mold surface. The above identified applications, incorporated herein by way of reference, utilize the resistive properties of the mold to provide a portion of the heat required for the thermal decomposition of the chemical vapor materials involved and also utilize an auxillary travelling hot zone.

The methods which propose deposition of the glass forming constituents on the exterior surface of a refractory mandrel usually involve drilling away the mandrel once the glass materials have been consolidated into a solid continuous cylinder or use the refractory substrate as a bait in the fiber drawing process.

SUMMARY OF THE INVENTION

This invention provides for the deposition of glass forming constituents upon the exterior surface of a heated substrate and for removing the glass forming materials in a solid form.

The invention further contemplates the use of a plurality of substrates and a common source of chemical constituents in vapor form to simultaneously deposit the glass forming materials upon the plurality of substrates.

In one embodiment of the invention the deposition substrate is heated by electrical resistance heating or by a radio frequency field and the glass constituents are deposited on the mandrel by means of a directed vapor stream containing the glass forming constituents.

Electrically conductive cylindrical preform substrates are used for the chemical vapor deposition thereon of highly purified glass-forming materials. The chemical decomposition process occurs at the heated substrate surface which is heated by means of radio frequency coils or by passing an electrical current through the substrate. A plurality of similar substrates can be subjected to a common atmosphere containing the deposition materials in chemical vapor form to provide a mass production facility.

The deposition substrates can readily be removed from the glass preform materials and re-used repeatedly. The deposition substrates are chosen to have a coefficient of thermal expansion greater than the coefficient of thermal expansion coefficient of the glass material. The deposition substrates are kept at a relatively high temperature during the deposition and fusing process and are rapidly cooled after the glass forming materials have been fused thereon. The differential expansion properties between the substrates and the fused optical fiber preforms allow the substrates to shrink away from the preforms for easy removal.

In a variation of this invention the preform substrates can be first coated with a layer of pure carbon or other such pure elements which act as diffusion barriers before commencing the deposition of the glass constituents. Pyrolysis of carbon bearing gaseous substances can be employed to yield very high purity carbon. Carbon is particularly preferable when graphite substrates are used because it can replenish the carbon that might be lost due to oxidation at the beginning of the glass deposition process when free oxygen can react with the hot carbon surface.

When the tubular preform is found to have any residual carbon deposits left behind, they can be easily cleaned by heating the preforms to a temperature at which carbon readily oxidizes and simultaneously exposing the inside surface of the preform to oxygen.

The fiber optic preforms according to the invention can be collapsed into solid rods and drawn directly into optical fibers or drawn into optical fibers by the concentric cylinder process.

BRIEF DESCRIPTION OF THE DRAWINGS

FIG. 1 is a sectional view of the glass-forming apparatus of this invention;

FIG. 2 is a top perspective view of two concentric glass cylinders made by the method of this invention;

FIG. 3 is a side perspective view of a coated cylinder according to the invention;

FIG. 4 is a top perspective view of the fiber optic preform of this invention being heated and drawn into an optical fiber;

FIG. 5 is a cross section of an optical fiber formed from the preform of FIG. 4; and FIG. 6 is a top perspective view of a further embodiment of the glass-forming apparatus according to the invention.

DESCRIPTION OF THE PREFERRED EMBODIMENT

FIG. 1 shows a manifold assembly 10 consisting of upper and lower chambers, 11, 12 interconnected by an intermediate chamber 13. Supported within chamber 13 is an electrically conductive substrate 14 having an electrical contact 15 at each end. The substrate 14 may be formed of carbon or silicon carbide. Surrounding the deposition substrate 14 is a cylindrical porous enclosure 16 and surrounding enclosure 16 are a plurality of cooling coils 17. The purpose of the cooling coils 17 is to ensure that the porous chamber 16 remains substantially cooler than the deposition substrate 14. A gas inlet 18 is situated proximate the porous chamber 16 for introducing materials in a gas phase through the porous cylinder 16 for contact with substrate 14. In the deposition process the chemical reagents in vapor form enter the inlet 18 and pass through the porous cylinder 16 to contact the heated substrate 14 and become dissociated and deposited thereupon. The gaseous by-products of the decomposition process readily exit via the outlets 19 at both ends of the chamber 13 and therefrom into chambers 11 and 12. Prior to depositing materials within the chamber 13 the entire apparatus 10 is first evacuated by means of chambers 11 and 12 with the inlet 18 closed. The deposition substrate 14 is heated to remove any materials therefrom and to ensure that no foreign materials enter into the subsequent chemical reactions which take place within the apparatus 10. After heating the deposition substrate 14 to an incandescent temperature and evacuating the entire deposition apparatus 10, the temperature through the deposition substrate 14 is reduced to the temperature required for subsequent chemical reactions.

The temperature of the heated deposition substrate 14 is substantially reduced below incandescence and is carefully adjusted by adjusting the current passing through the electrodes 15. A slight partial vacuum is applied to chambers 11 and 12 to ensure that the by products of decomposition will exit away from the vicinity of the porous cylinder 16 and from the surface of the substrate 14. When the deposition substrate 14 comprises a carbon cylinder and one of the deposition materials comprises silicon tetrachloride*, the silicon tetrachloride in a stream of oxygen is allowed to enter via inlet 18 and to pass through the porous cylinder 16 into contact with the heated deposition substrate 14 in order to form a thin layer of silica glass on the surface of the substrate 14. The temperature of the deposition substrate 14 is kept relatively low until a sufficient quantity of silica is deposited thereon. The temperature of the deposition substrate 14 is then gradually increased until an optimum temperature is reached whereby the silicon tetrachloride material will contact the heated deposition substrate 14 and readily form continuous layers of silicon *silicon tetrachloride is understood to mean a mixture of halides of silicon and other doping elements such as Germanium, Phosphorus, etc. dioxide. The purpose of keeping the deposition substrate 14 at a relatively low temperature is to ensure that the carbon substrate 14 does not become oxidized during the deposition process. The purpose of the water cooling coils 17 surrounding the porous cylinder 16 is to ensure that the temperature of the walls of the cylinder 16 is lower than the decomposition temperature for the gaseous chemical reagents employed. When, for example, silicon tetrachloride is one of the reagents and the reagent is entrained in oxygen gas the silicon tetrachloride molecules contacting the cooled cylinder 16 will not dissociate to form silica but will readily transfer through the internal walls of cylinder 16 and contact the heated substrate 14 where dissociation and deposition readily occurs.

After a sufficient quantity of silica has been deposited upon the substrate 14, the electrical current through the substrate 14 is shut off and the gas flow through inlet 18 is discontinued. The water cooling coils 17 then cause the cylinder 16 and the silica coated substrate 14 to cool at a rapid rate.

The differential thermal properties existing between the deposited silica material and the deposition substrate 14 are such that the substrate shrinks to a much greater extent than the deposited silica material. This readily allows the silica material to become separated from the deposition substrate 14 and greatly facilitates removal therefrom. The method of this invention therefore provides for the forming of a very high purity silica tube which can be used as the outer surface of an optical fiber preform.

When high purity optical fiber core materials are to be generated by the method of this invention, the core-generating materials are introduced into the inlet 18 in combination with the silicon tetrachloride to form the respective doped silica material on heated substrate 14. When a core material such as germania-silicate is to be formed, then silicon tetrachloride in vapor form is introduced through inlet 18 with germanium tetrachloride such that the germania and silica readily form on the surface of the deposition substrate 14 by the method described earlier. When cladding forming materials are to be generated by the method of this invention than a dopant which effectively lowers the index of refraction of silica is allowed to enter the inlet 18 with the silicon tetrachloride. One such material would be for example, boron trichloride which is introduced simultaneously with the silicon tetrachloride by entrainment within a stream of pure oxygen gas. The boron trichloride and silicon tetrachloride readily react and deposit boron and silicon oxides upon the heated substrate 14 to provide the cladding material as described earlier for the core material. Although it is not a necessary feature of this invention, the core and cladding materials are generated as cylinders when for example, the deposition substrate 14 is in cylindrical form.

When both the core and cladding materials comprise glass cylinders, the fiber optic preform of this invention is formed by inserting the core cylinder within the cladding cylinder and heating both to collapse and form the preform. FIG. 2 shows an inner cylinder 21 of germania silicate glass and an outer cylinder 20 of borosilicate glass both of which are formed by the high purity deposition method of the invention. The two concentric cylinders 21 and 20 are then uniformly heated to collapse and to form a solid preform.

A collapsed preform 22 is shown in FIG. 4 where the inner core material 21 is shown surrounded by the cladding material 20.

When the preform 22 is heated to its softening temperature by suitable heating means such as oxy-hydrogen burners 32 the resulting drawn optical fiber 33 results having the cross section indicated in FIG. 5 where the core 21 and the cladding 20 of the preform 22 provide the core 21 and cladding 20 of the resulting optical fiber 33.

The two-cylinder arrangement of FIG. 2 for forming fiber optic preform 22 requires two separate deposition operations on two separate deposition substrates 14. In order for the core cylinder 21 to fit inside the cladding cylinder 20 as shown in FIG. 2, the heated deposition substrates 14 must have different diameters to provide the required fit between the respective cylinders 21 and 20. For some applications, it is more convenient to deposit both the core and the cladding materials in a single process. This is readily accomplished with the apparatus of FIG. 1 by first reproducing the core material germanium tetrachloride and silicon tetrachloride via inlet 18 until a sufficient quantity of germania silicate glass has formed on the deposition substrate 14. After a suitable quantity of germania silicate glass has been formed, boron trichloride is substituted for or added to the germanium tetrachloride through inlet 18 and the reaction is allowed to continue until a suitable quantity of borosilicate glass is formed over the germania silicate core material. The inlet 18 is then closed and the coated material is removed from the substrate 14 by the method of differential thermal expansion as described earlier. A single cylinder 23 having an outer layer 20' of borosilicate glass and an inner layer 21' of germania silicate glass is shown in FIG. 3. The cylinder 23 is heated and collapsed to form a solid preform in the manner described for the embodiment of FIG. 2.

In order to simultaneously provide a large number of coated cylinders by the method of this invention the apparatus of FIG. 6 is employed. A removable cover element 24 having a plurality of apertures 25 and a suitable handle 26 is used to hold a plurality of deposition substrates 14. Each of the individual deposition substrates 14 has a corresponding electrode element 15 at each end thereof. In combination with the cover means 24 there is a deposition apparatus 10' which contains an inlet 28 and an outlet 29 for the intake and exhaust of the chemical vapor deposition materials. In a manner similar to the operation of the apparatus described in FIG. 1, a plurality of cooling coils 17' surrounds the cylindrical housing 27 to prevent the reaction from occuring on the inner surface thereof. When the cover member 24 is placed over the housing 27 the plurality of deposition substrates 14 become enclosed within the apparatus 10'. In order to ensure electrical continuity through each deposition substrate 14 a plurality of electrodes 15 correspondingly contact the bottom ends 30 of each of the respective deposition substrates 14. The electrodes 15 are provided within the inner surface of the bottom of the housing 27 for electrical contact therewith.

The apparatus 10' of FIG. 6 operates in a manner similar to that described earlier for the apparatus 10 of FIG. 1 except that the porous cylinder 16 is no longer required since the deposition materials enter inlet 28 and directly contact and react with the deposition substrates 14. The by-products of the chemical reactions that occur in the vicinity of the deposition substrates 14 readily exit via exhaust 29. In a similar manner as described earlier the electrical parameters of each deposition substrate 14 are carefully monitored during the deposition process in order to determine the rate and quantity of material deposited thereupon each individual deposition substrate 14. The apparatus described in FIG. 6 therefore provides a method for the simultaneously vapor deposition of highly purified glass materials on a plurality of substrate members 14 in one continuous and carefully controlled operation.

When the multiple element deposition apparatus 10' of FIG. 6 is to be heated partially by the method of electrical resistance heating described earlier and the heating is to be supplemented by radio frequency heating, then the housing 27 must consist of an electrically insulating material.

The cooling coils 17' surrounding electrically insulated container 27 can then be attached to a source of radio frequency energy and the heating of each substrate 14 can be supplemented by radio frequency heating via coils 17'. When the coils 17' are to be used to preferentially heat segments of the substrate 14, then each individual coil 17' can be an electrically separate entity and radio frequency contact can be made to each coil in a sequence of steps. For example, the radio frequency heating may begin at the bottom of the housing 27 by contacting the lowest coil 17' with a source of radio frequency energy whereby the portion of the deposition substrate 14 enclosed by the lower most coil 17' will become selectively heated. After a sufficient quantity of material has been deposited in the vicinity of the auxiliary-heated section of the substrate 15 enclosed by the lower most coil 17' then the next upper most coil can be radio frequency energized and the sequence can continue until the reaction is caused to occur from one end of the housing to the other ending with energizing uppermost coil 17'.

Although the mass manufacturing process of the optical fiber preforms of this invention is directed to thermal dissociation of chemical vapor materials the method of applying the glass forming materials also includes a glow discharge. When a glow discharge technique is to be employed for depositing the glass forming materials on the substrate 14, then the housing 27 can consist of an insulating material, such as alumina, and the cooling coils 17' can be energized by radio frequency means. The cover 24 can also be of an insulating material such as alumina and the elements 14 can be simultaneously or sequentially electrically connected via electrodes 15. The glow discharge method of applying the glass materials can comprise the introduction of silicon tetrachloride in an oxygen stream via inlet 28 and the excitation of any one of the plurality of encircling coils 17' with radio frequency energy whereby each of the elements 14 becomes enclosed within a glow discharge plasma containing the silicon material. The high energies created within the glow discharge plasma are sufficient to decompose the silicon tetrachloride in the presence of oxygen and to cause silicon dioxide to deposit directly on the substrates 14.

Although the method of depositing high purity glass materials to the surface of suitable deposition substrates is directed to optical fiber preforms, this is by example only. The multiple deposition process of this invention applies wherever such multiple deposited high purity materials may be required.

I claim:

1. Apparatus for manufacturing an optical fiber preform, comprising:

at least one deposition substrate formed of an electrical resistant material;

means for passing an electrical current through said substrate whereby said substrate is heated over its entire length;

enclosure means for receiving said substrate and enclosing it from atmosphere;

inlet means for introducing glass-forming materials in vapor form into the enclosure means;

exhaust means for removing decomposition by-products from the enclosure means; and a porous member disposed about said substrate and in the path of said vapor between said inlet means and said substrate, whereby the glass-forming materials in vapor form pass through the porous member prior to contacting the surface of the substrate for forming glass on said heated deposition substrate.

2. The apparatus of claim 1 wherein the deposition substrate comprises a cylinder.

3. The apparatus of claim 1 wherein the deposition substrate is selected from the group consisting of carbon and silicon carbide.

4. The apparatus of claim 1 further including means for supporting said substrate.

5. The apparatus of claim 1 additionally comprising cover means including at least one aperture therein for receiving and supporting the substrate.

6. The apparatus of claim 1 wherein the substrate contains an electrode at either end thereof for connecting the substrate to a source of electricity.

7. The apparatus as described in claim 1, additionally comprising means for providing radio frequency energy heating of the substrate.

8. The apparatus of claim 1 wherein the porous member is a hollow cylinder surrounding said substrate.

9. The apparatus of claim 8 wherein the exhaust means comprises a pair of manifolds disposed at the ends of the porous cylinder and in communication with the hollow interior thereof.

10. The apparatus of claim 1, additionally including means for cooling said porous member so that the glass-forming materials do not deposit on the porous member.

* * * * *